INVENTOR:
RAGHUNATH G. MOKADAM
BY
*Alexander & Speckman*
ATT'YS

United States Patent Office 3,621,666
Patented Nov. 23, 1971

3,621,666
COOLING APPARATUS AND PROCESS
Raghunath G. Mokadam, Chicago, Ill., assignor to
American Gas Association, Arlington, Va.
Filed Nov. 28, 1969, Ser. No. 880,733
Int. Cl. F25b *7/00*
U.S. Cl. 62—79
16 Claims

ABSTRACT OF THE DISCLOSURE

Apparatus and process for cooling by contacting a pressurized, heated gas with one face of a non-porous permeable membrane supported on both faces by rigid porous material, passing the gas through the membrane by means of solution therein, evaporating gas from solution in said membrane at the other face of said membrane, the evaporated gas being at a lower temperature and lower pressure than before its passage through the membrane, heat-exchange means being placed on both sides of the membrane.

---

Cooling devices and methods in the prior art, such as motor driven compressor systems and absorption refrigeration systems, depend heavily on harnessing the energy change which occurs upon the change of phase from liquid to gas of a refrigerant material. Thus it is necessary to have a refrigerant which is condensible to a liquid within the operating range of temperatures and pressures. This limits somewhat the materials which may serve as refrigerants. Also, in prior art devices and methods, problems arise relating to the pressure valve which is between the condenser and evaporator. Valve breakdowns can frequently occur for a variety of reasons.

In my invention, the aforementioned problems have been eliminated by use of a novel process and apparatus which harnesses an energy change which does not involve condensation to a liquid. Specifically, my invention harnesses the energy change of solution of a gas in a non-porous permeable membrane. That is, a gas which dissolves exothermically into a permeable membrane requires the addition of heat energy to evaporate it from solution with the permeable membrane. The heat required to evaporate a gas from solution in a permeable membrane may be removed from the heat source to be cooled. Some permeable membranes, having one face exposed to a particular relatively high temperature and high pressure gas, will allow passage therethrough by means of solution of the gas in the membrane and subsequent evaporation of the gas at the other face of the membrane, which is exposed to the same gas at a relatively low temperature and low pressure. A thermal exchanger placed on the high temperature and high pressure side of the permeable membrane will absorb heat of solution, and another thermal exchanger placed on the low temperature and low pressure side of the permeable membrane will provide heat to cause the dissolved gas to evaporate from solution in the permeable membrane. After the gas has passed through the permeable membrane, it may be compressed and recirculated to the permeable membrane at higher pressure and resultant higher temperature, pressure and temperature substantially equal to the previous high pressure and temperature, to pass therethrough in the same direction again. The gas, in being recirculated, will carry additional heat of transfer from the thermal exchanger on the low temperature and low pressure side to the thermal exchanger on the high temperature and high pressure side which will remove this heat from the system.

Furthermore, my invention eliminates the necessity of a valve between the condenser and evaporator. The non-porous permeable membrane serves to separate the low and high pressure areas.

It is one object of this invention to provide a novel cooling apparatus and process for use on a wide variety of cooling applications.

It is another object of this invention to provide a cooling apparatus and process making use of the energy change of solution of a gas with a permeable membrane.

It is a further object of this invention to provide a cooling apparatus and process eliminating the aforementioned pressure valve used in prior art cooling devices.

Yet another important object of this invention is to provide a novel cooling apparatus and process which can use refrigerants which are not condensible at operating pressures and temperatures.

Still another object of my invention is to provide a cooling apparatus and process which has no liquid refrigerant.

Another object of this invention is to provide a cooling apparatus and process using a non-porous permeable membrane having the same material on both faces thereof.

These and other important objects will become apparent from the following description and from the drawings showing preferred embodiment wherein.

Figure 1:
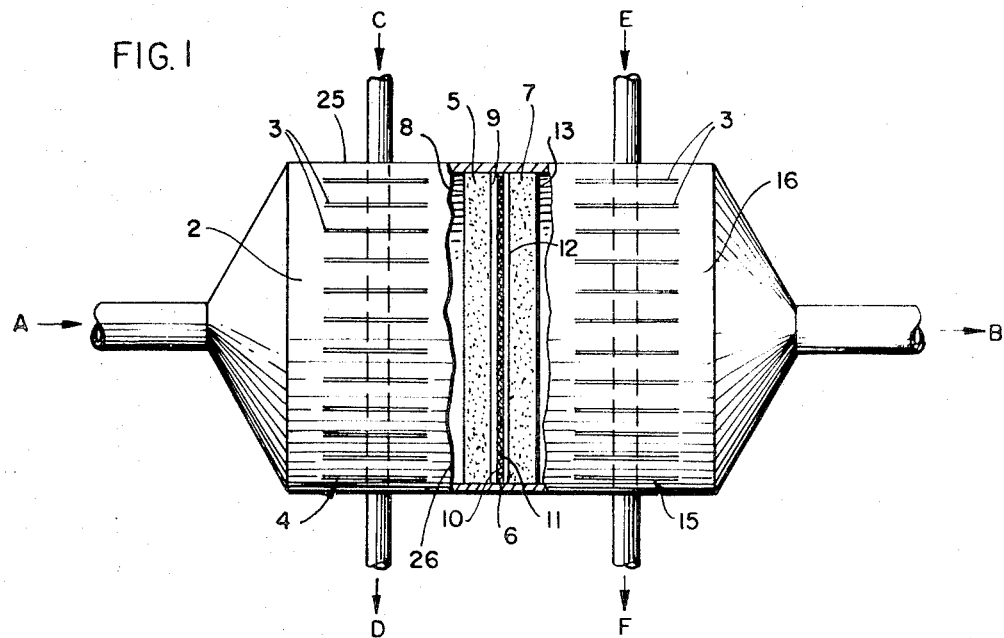
FIG. 1 is a partial cutaway plan view of a cooling apparatus.

Referring specifically to FIG. 1, a cooling apparatus of this invention is shown having container 25 defining passageway 26, inlet passage 2, outlet passage 16, inlet thermal exchanger 4, outlet thermal exchanger 15, fins 3 on both of the thermal exchangers, permeable membrane 6 having membrane first face 10 and membrane second face 11, first porous structure 5 having first porous structure first face 8 and first porous structure second face 9, and second porous structure 7 having second porous structure first face 12 and second porous structure second face 13. The permeable membrane extends across passageway 26 and with container 25 defines inlet passage 2 and outlet passage 16.

A gas enters the cooling apparatus at A at a temperature of $T_1$ and having been pressurized to $P_1$. The gas passes through first porous structure 5, contacts membrane first face 10 and goes into solution with permeable membrane 6 at membrane first face 10. As the gas goes into solution, the heat of solution is absorbed by inlet thermal exchanger 4, said inlet thermal exchanger being proximate to first porous structure 5 and therefore also to membrane first face 10. Inlet thermal exchanger 4 also absorbs some sensible heat, heat of transfer, of the gas except for the heat which is conducted through the membrane.

The dissolved gas flows in solution through permeable membrane 6. As heat is provided by outlet thermal exchanger 15, the dissolved gas evaporates from solution in the permeable membrane at membrane second face 11. Besides absorbing heat which becomes the heat of solution, the gas absorbs additional heat from the outlet thermal exchanger. Heat conducted through the permeable membrane is also absorbed by the gas after passing through the membrane. Therefore, a net cooling effect approximating the heat of solution plus the heat of transfer minus the heat of conduction occurs in the outlet thermal exchanger. The gas, at pressure $P_2$, less than $P_1$, and temperature $T_2$, less than $T_1$, exits the cooling apparatus at B.

The gas then may, in being recycled in a closed system, be compressed, the temperature increasing correspondingly, and recycled to enter the cooling apparatus again at A.

The theory of gas flow in solution with a non-porous permeable membrane is not completely understood. I have observed that the volume of gas flow is related to the temperature gradient across the membrane and the pressure gradient across the membrane. A relatively large pressure gradient across a permeable membrane generally will cause a relatively high rate of gas flow in solution from the high pressure to the low pressure side. A relatively large thermal gradient across a permeable membrane will cause a relatively high rate of flow from the low temperature side to the high temperature side. The effect of a high thermal gradient can overcome the effect of a pressure gradient and thus allow flow of gas from low pressure and low temperature side to high pressure and high temperature side. In the cooling apparatus and process of this invention, a relatively high pressure gradient and a relatively low thermal gradient are preferred. It is required that the effect of the pressure gradient on gas flow exceeds the effect of the thermal gradient. The relative solubility of a gas in a membrane at the differing pressure and temperature conditions and the resultant concentrations of solution at the membrane faces are probably factors in gas flow in solution with a non-porous permeable membrane. I have found that the flow rate varies directly with the level of pressure of the system, temperatures and temperature gradient being constant.

Figure 2:
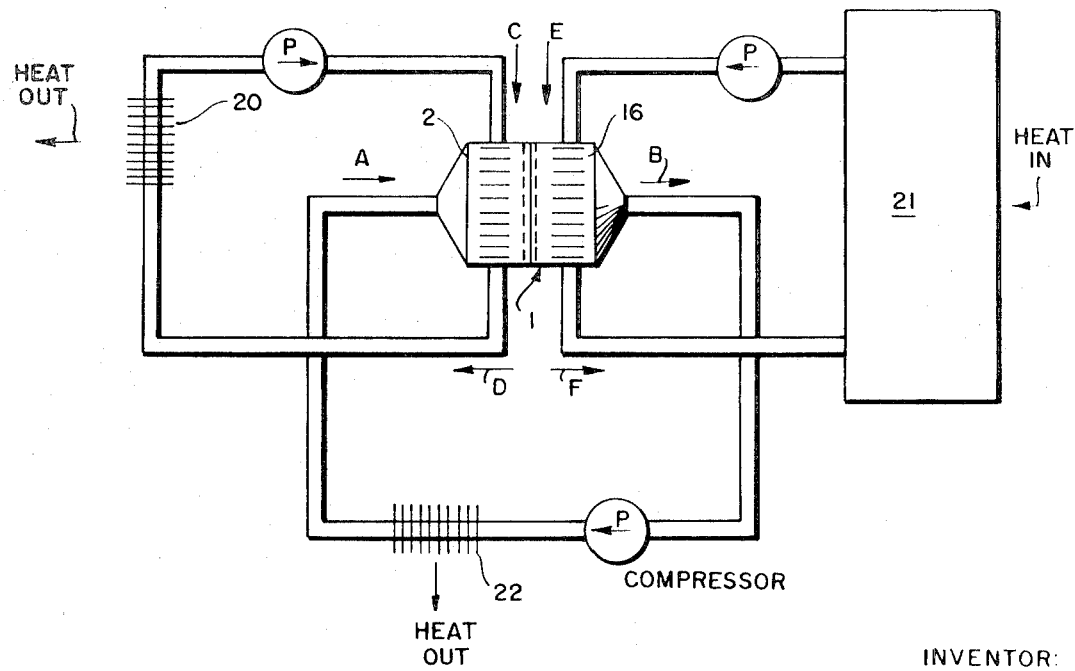
FIG. 2 is a schematic drawing of a cooling system using the cooling apparatus of FIG. 1.

Referring specifically to FIG. 2, a cooling system is shown having cooling apparatus 1 of FIG. 1, heat sink heat exchanger 20, heat source 21 and cooler 22. The system may be used to cool heat source 21. Fluid from heat source 21 is pumped by pumping means as illustrated through outlet thermal exchanger 15, which extends across outlet passage 16. The fluid enters outlet thermal exchanger 15 at E and exits at F. Heat from heat source 21 is transferred by means of outlet thermal exchanger 15 causing the gas to leave solution with permeable membrane into outlet passage 16. Additional heat, the heat of transfer, from heat source 21 is also transferred by means of outlet thermal exchanger 15. The fluid from heat source 21, having given up heat in outlet thermal exchanger 15, returns to heat source 21 at a lower temperature than before passage through outlet thermal exchanger 15.

In a similar way, a fluid is pumped by pumping means as illustrated through inlet thermal exchanger 4, which extends across inlet passage 2. The fluid enters inlet thermal exchanger 4 at C and exits at D. The fluid in inlet thermal exchanger 4 absorbs heat of solution generated when the gas dissolves into the permeable membrane. The fluid in inlet thermal exchanger 4 also absorbs heat of transfer from the gas in inlet passage 2. Heat conducted through the permeable membrane is not absorbed by the fluid in inlet thermal exchanger 4. After the fluid exits the inlet thermal exchanger having been heated therein, it is pumped to heat sink heat exchanger 20 which transfers the heat of the fluid to a heat sink. In steady state, the amount of heat removed from heat source 21 approximates the amount of heat discharged at heat sink heat exchanger 20.

Cooler 22, through which the gas flows after compression by the compressing means as shown, removes some of the heat caused by such compression of the gas. The cooler is not always required, but is preferred because, as earlier mentioned, a high thermal gradient impedes gas flow in solution through the membrane. However, the temperature of the gas after being cooled here should be above the temperature of the heat sink, to allow discharge of heat at the heat sink heat exchanger. After the gas passes cooler 22 it enters cooling apparatus 1 at A at pressure and temperature both higher than the pressure and temperature as it previously exited cooling apparatus 1 at B. The pressure and temperature conditions in outlet passage 16 of cooling apparatus 1 are such that the direction of gas flow is from inlet passage 2 to outlet passage 16, solubility of the gas with the permeable membrane being significantly less than solubility of the contained gas with the permeable membrane in inlet passage 2. Thus the direction of gas flow will be from A to B of cooling apparatus 1. The direction of net thermal energy flow will be from B to A of cooling apparatus 1, the flow of heat of solution being from B to A, the flow of heat of transfer being from B to A, and the flow of heat due to conduction being from A to B.

The porous structure referred to above offers only negligible resistance to gas flow. Gas may enter first porous structure 5 at first porous structure first face 8 and exit second porous structure 7 at second porous structure second face 13 with substantial freedom. The porous structures provide support for permeable membrane 6, which is placed between said porous structures, membrane first face 10 being against first porous structure second face 9 and membrane second face 11 being against second porous structure first face 12. The material used for porous structures may be any material which would provide adequate support for the membrane and allow substantially free passage of a gas. Another important factor to be considered in choosing material for the porous structures is conductivity. It is highly preferable that the porous structures have a high thermal conductivity to enable adequate passage of heat both to and from the non-porous permeable membrane. Preferred materials are highly porous to allow substantially free passage of gas, strong and of even texture to provide rigid support for the membrane, and of a high conductivity. Examples of preferred materials are porous ceramic and porous metallic pieces. Especially preferred materials are porous bronze, steel and copper. The thickness may vary widely, the considerations being degree of support, passage of gas and conduction of heat. Durability and corrosion resistance are other factors to be considered in choosing a material for the porous structures.

The permeable membrane of this invention must be of a material which can serve as a solvent for the gas being used. The membrane must be non-porous, that is, gas must not be allowed to pass therethrough free of solution. It is also necessary that the solubility of the gas in the membrane be higher at the higher pressure and temperature conditions which will be used than at the lower pressure and temperature conditions. It is highly preferred that the membrane have a low thermal conductivity; lower conductivity will provide higher efficiency in the cooling apparatus. The membrane must be chosen in reference to the gas to be used and vice versa.

The thickness of the membrane may vary over wide ranges, keeping in mind that thinness favors gas passage and thickness allows less undesired heat conduction. These factors must be balanced. A preferred range is from .001 to .010 inch. I have found in my work that approximately .002 inch is a favorable thickness for natural rubber latex. The membrane face area may vary over a large range, depending upon configuration, capacity and requirement of associated apparatus.

Although the membrane will normally be made of one material and have that material on both faces thereof, by ganging several membrane layers a larger thermal gradient may be obtained across the membrane. The permeable membrane may be laminated, and may contain several different materials.

Any gas which cannot be condensed at the desired operating conditions and will be dissolved in the permeable membrane being used is suitable for this invention. If the invention is to be used in a room air-conditioning application, the gas must be such that it will not condense at ambient temperatures. An example of such a gas is carbon dioxide.

As previously mentioned, the gas must be chosen in view of the choice of permeable membrane. A preferred combination of gas and permeable membrane is carbon dioxide with dimethyl silicone rubber latex. Nitrogen may also be used with dimethyl silicone rubber latex. Another preferred combination of gas and permeable membrane is carbon dioxide with natural rubber latex. Especially preferred combinations are Freon 11, Freon 12 and Freon 22 with natural rubber latex. Freon designates a group of halogenated hydrocarbons containing one or more fluorine atoms which are widely used as refrigerants.

The container for the cooling apparatus may be made in a wide variety of shapes and sizes. The container must be substantially airtight except as indicated at A and B. The container may be made of any material which would serve as support for the various components set forth. It is preferred that the container be made of material of low thermal conductivity. Suitable material would be apparent to one skilled in the art and familiar with the invention. Similarly the heat sink heat exchanger, cooler, conduits connecting the components of the system, and the pumps as indicated are standard in the art and would be apparent to one familiar with this invention.

The inlet and outlet thermal exchangers extend across the inlet and outlet passages, respectively, passing in airtight fashion through the container and providing thermal communication from and to said cooling apparatus. Gas in the inlet and outlet passages may pass the inlet and outlet thermal exchangers substantially free in heat-exchange relation.

The inlet and outlet thermal exchangers may be of widely varying types. Any thermal exchanger which may be used to transfer heat from one fluid to another is suitable. Tubes with fins are preferred. It is preferred that fins be made of a highly thermal-conducting porous metal. Sintered stainless steel 60% dense is especially preferred. Copper surfaces are also preferred. The use of a porous type metal will promote thermal exchange between the contained gas and the inlet and outlet thermal exchangers.

The cooling apparatus and process of this invention may be used in many different applications. Its advantages, as aforementioned, are not limited to any particular cooling application or applications. The apparatus and process may be used for wide varieties of refrigeration applications. In particular it may be used for air-conditioning. Thus the heat source of FIG. 2 would be air in the space to be cooled. The apparatus and process may also be used for cooling of reactants and other chemicals in many chemical processes. The heat source in a chemical process would be the reactant or other chemical fluid. Numerous other specific applications would be apparent to one skilled in the art and familiar with this invention.

The terms "low" and "high" when used to modify pressure or temperature have been used in a relative sense herein, that is, relating to the gas conditions on opposing sides of the membrane. This invention is operable over wide ranges of pressure and temperature, limited only by the use intended and by structural and operational factors.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

EXAMPLE

The system of FIG. 2 is used, the cooling apparatus gas being carbon dioxide and the permeable membrane being natural rubber latex. Heat source 21 is a room having an air temperature, at steady state, of 70° F. The pressure and temperature conditions of the contained gas at designated points of flow on either side of the membrane in the system at steady state are represented in the chart below.

| Point: | Temperature (° F.) | Pressure (p.s.i.a.) |
|---|---|---|
| B | 55 | 500 |
| A | 130 | 1,000 |

Temperatures at other points in the system at steady state are as follows:

The atmospheric heat sink to which heat sink heat exchanger is exposed, 95° F.; at E, 70° F.; at F., 60° F.; at C, 110° F.; and at D, 125° F.

The apparatus and process, as shown in this example, provide a suitable air conditioning system.

I claim:

1. A process for cooling comprising the steps of
passing a high pressure and high temperature gas in heat-exchange relation to an inlet thermal exchanger, said inlet thermal exchanger cooling said gas and a membrane first face of a non-porous permeable membrane, contacting said gas with said permeable membrane at said membrane first face, said gas being capable of solution in said permeable membrane and said membrane not permitting substantial passage of gas therethrough except by means of solution, passing said gas through said permeable membrane by solution of said gas into solution with said permeable membrane at said membrane first face, movement of said dissolved gas within said permeable membrane to a membrane second face of said permeable membrane and evaporation of said dissolved gas from said permeable membrane at said membrane second face upon heating of said membrane second face by an outlet thermal exchanger, said gas evaporated from said membrane second face having low pressure and low temperature, and said gas having lower solubility in said membrane at said low pressure and low temperature than at said high pressure and high temperature, and passing said gas in heat-exchange relation to said outlet thermal exchanger, said outlet thermal exchanger heating said gas.

2. The process of claim 1 wherein said gas is recycled in a closed system, means being provided to raise the pressure and temperature of said gas prior to reuse in the process.

3. The process of claim 2 wherein said permeable membrane is of one material.

4. The process of claim 2 wherein said permeable membrane has several membrane layers.

5. The process of claim 2 wherein said gas is Freon 22 and said permeable membrane is natural rubber latex.

6. The process of claim 2 wherein said gas is Freon 22.

7. The process of claim 2 wherein said gas is a Freon.

8. The process of claim 2 wherein said permeable membrane is natural rubber latex.

9. A cooling apparatus comprising a container defining a passageway, said passageway divided by a non-porous permeable membrane extending thereacross, said container and said permeable membrane defining an inlet passage and an outlet passage such that a gas may not freely flow from one section to the other, said permeable membrane permitting substantial passage of gas therethrough only by means of solution, said permeable membrane having a membrane first face and a membrane second face, an inlet thermal exchanger being proximate to said membrane first face, an outlet thermal exchanger being proximate to said membrane second face, said thermal exchangers providing thermal communication from and to said cooling apparatus, a gas in both said inlet passage and said outlet passage, said gas having high temperature and high pressure in said inlet passage and low temperature and low pressure in said outlet passage.

10. The cooling apparatus of claim 9, said non-porous peremable membrane being supported by a first porous structure, said first porous structure having a first porous structure second face against said membrane first face of said permeable membrane and providing support for said permeable membrane, and a second porous structure, said second porous structure having a second porous structure first face against said membrane second face and providing support for said permeable membrane.

11. The cooling apparatus of claim 9 wherein said permeable membrane is of one material.

12. The cooling apparatus of claim 9 wherein said permeable membrane has several membrane layers.

13. The cooling apparatus of claim 9 having compressing means providing for recycling of said gas in a closed system.

14. The cooling apparatus of claim 13 wherein said gas is Freon 22 and said permeable membrane is natural rubber latex.

15. The cooling apparatus of claim 13 wherein said gas is a Freon.

16. The cooling apparatus of claim 13 wherein said permeable membrane is natural rubber latex.

References Cited

UNITED STATES PATENTS

| 2,182,098 | 12/1939 | Sellew | 62—116 |
| 3,407,622 | 10/1968 | Turnblade | 62—498 |
| 3,407,626 | 10/1968 | Turnblade | 62—498 |

WILLIAM J. WYE, Primary Examiner

U.S. Cl. X.R.

62—115, 116, 467, 498; 417—53, 65, 207